No. 792,589. PATENTED JUNE 20, 1905.
S. B. GRIMES.
PERCOLATOR.
APPLICATION FILED APR. 22, 1904.

WITNESSES
H. Engelhardt
H. A. Hull

Samuel B. Grimes
INVENTOR
By James A. Ramsey
ATTORNEY

No. 792,589.

Patented June 20, 1905.

UNITED STATES PATENT OFFICE.

SAMUEL B. GRIMES, OF CINCINNATI, OHIO.

PERCOLATOR.

SPECIFICATION forming part of Letters Patent No. 792,589, dated June 20, 1905.

Application filed April 22, 1904. Serial No. 204,417.

*To all whom it may concern:*

Be it known that I, SAMUEL B. GRIMES, a citizen of the United States, residing at Cincinnati, in the county of Hamilton and State of Ohio, have invented certain new and useful Improvements in Percolators, of which the following is a specification.

My invention relates to improvements in apparatus for percolating.

The object of my invention is to produce a simple, convenient, and economical apparatus for extracting the strength from drugs and the like.

My invention consists of a vessel, a receptacle therein having an open top, a strainer at the bottom, a sieve or perforated diaphragm, preferably removable, between said top and bottom, and a base or band having lateral openings.

My invention also consists in the construction, combination, and arrangement of the several parts, as herein set forth and claimed.

Figure 1:
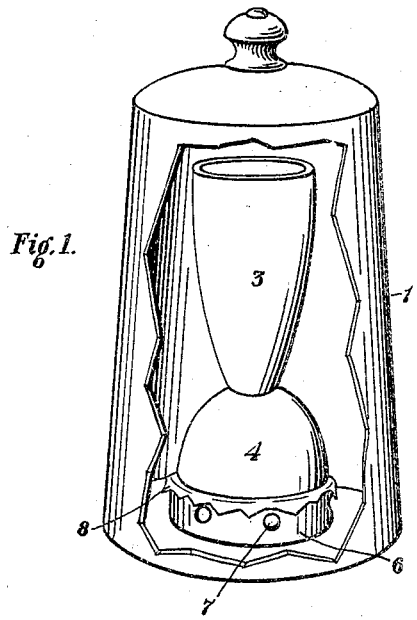
Figure 2:
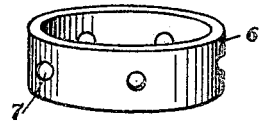
Figure 3:
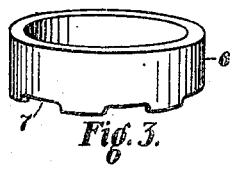
Figure 4:
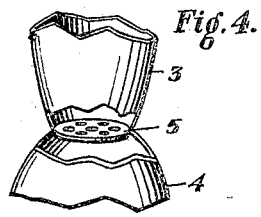
Figure 5:
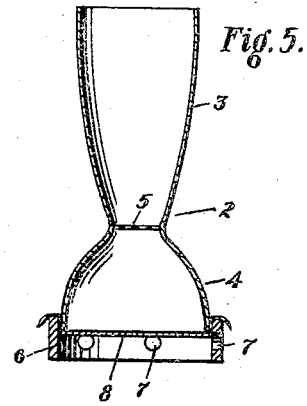
Figure 6:
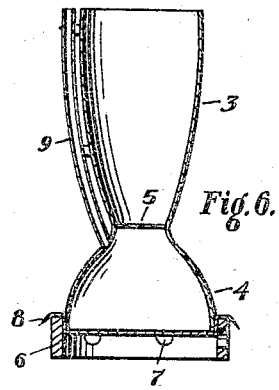

In the accompanying drawings, Figure 1 is a perspective view of my invention, the outer vessel being broken away to show the interior. Fig. 2 is a perspective view of the perforated band. Fig. 3 is a perspective view of a modification thereof. Fig. 4 is a perspective view of the central part of the receptacle broken away to show the position and construction of the sieve or perforated diaphragm. Fig. 5 is a vertical section of the receptacle mounted on the base with the strainer in place. Fig. 6 is a similar view showing the apparatus provided with an air-vent.

I prefer to construct my apparatus substantially as shown. The outer vessel 1 may be of any ordinary form and construction, such as the closed-top vessel shown in Fig. 1. Within this vessel 1 I place a receptacle 2, preferably having a cup-shaped top 3 and dome-shaped bottom 4, separated into compartments by a fixed perforated diaphragm 5. A base or band 6, having lateral perforations or openings 7, is provided to receive and hold the vessel 2, with a strainer 8, preferably cloth, stretched across its lower end and held by engagement with the lower end and band. A vent 9 is provided to allow any accumulation of air within the dome or chamber 4 to escape.

My invention is intended for use as a percolator in extracting strength from drugs and the like in liquid form as follows: Put the drugs, preferably pulverized, into the chamber 4 of the receptacle, place the strainer 8 over the end, and adjust the band 6 to the position shown in Figs. 1, 5, and 6. Then place in the position shown in Fig. 1, fill the cup 3 with water or any fluid, preferably hot, and allow it to filter through the drug and strainer. The sieve or perforated diaphragm and strainer confine the undissolved drugs within the chamber, while the strainer allows the liquid to pass through and keeps it clear. The lateral openings in the band permit the fluid to pass outwardly and around the receptacle.

The construction of my apparatus in separable parts renders it convenient for filling, emptying, and cleaning and makes it more economical in construction. By this arrangement I am enabled to renew the strainer as often as required at a minimum expense.

My invention is specially adapted for use in percolating drugs, such as gentian, rhubarb, opium, coffees, sarsaparilla, vanilla, and the like.

An important advantage of my percolator is that it holds the drugs completely under the fluid which percolates through it.

From the foregoing description it will be seen that my invention is of an extremely simple and inexpensive construction and arrangement. It will also be apparent that my invention is capable of various changes in the details of construction—as, for instance, the strainer may be of cloth, wire, or other suitable material—and for this reason I do not wish to be understood as limiting myself to the precise form and arrangement of the several parts herein set forth; but

What I claim, and desire to secure by Letters Patent, is—

1. In a percolator, a vessel, a receptacle having open ends with a perforated diaphragm between said open ends all inclosed within said vessel, a band having lateral openings to permit the constant flow of liquid therethrough during the percolation and a strainer adapted to be held across one end of said receptacle by said band.

2. In a percolator, a vessel, a receptacle having open ends with a perforated diaphragm between said ends and all located within said vessel, a strainer upon one of said open ends, an air-vent leading from the chamber between said diaphragm and strainer, and a base having openings to permit the passage of the fluid therethrough into said vessel during percolation.

3. A percolator comprising a receptacle having open ends with a fixed perforated diaphragm between its ends, a base having open top and bottom and lateral openings, a strainer held upon one of said ends by said base above said lateral openings, a vessel and a space within said base between said strainer and vessel.

4. In a percolator, an outer vessel, a receptacle having open ends and contracted between its ends, a diaphragm held transversely in the contracted part of said receptacle, a base provided with lateral openings and adapted to rest upon the bottom of the vessel, a strainer, and said receptacle mounted upon said strainer and adapted to clamp it within said base and across the lower end of the receptacle.

SAMUEL B. GRIMES.

Witnesses:
JAMES N. RAMSEY,
H. E. ENGELHARDT.